(12) United States Patent
Schulz et al.

(10) Patent No.: US 7,880,416 B2
(45) Date of Patent: Feb. 1, 2011

(54) LOW SPEED SYNCHRONOUS MOTOR DRIVE OPERATION

(75) Inventors: Steven E. Schulz, Torrance, CA (US);
Goro Tamai, West Bloomfield, MI (US);
Scott Thompson, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 381 days.

(21) Appl. No.: 11/856,504

(22) Filed: Sep. 17, 2007

(65) Prior Publication Data

US 2009/0072778 A1    Mar. 19, 2009

(51) Int. Cl.
*H02P 6/08* (2006.01)
(52) U.S. Cl. ............. 318/432; 318/400.15; 318/400.23; 318/721
(58) Field of Classification Search .......... 318/268, 318/430–434, 700, 400.02, 400.15, 720–724, 318/400.23–400.28
See application file for complete search history.

(56) References Cited

U.S. PATENT DOCUMENTS

| | | | |
|---|---|---|---|
| 3,743,902 A * | 7/1973 | Perkins et al. | 318/400.06 |
| 3,883,785 A * | 5/1975 | Fulcher et al. | 318/400.04 |
| 4,085,355 A | 4/1978 | Fradella | |
| 4,132,368 A | 1/1979 | Schiess et al. | |
| 4,240,020 A | 12/1980 | Okuyama et al. | |
| 4,320,331 A | 3/1982 | Plunkett | |
| 4,362,976 A * | 12/1982 | Fujioka et al. | 388/819 |
| 4,429,262 A * | 1/1984 | Utenick | 318/400.12 |
| 4,513,231 A * | 4/1985 | Kuno et al. | 388/821 |
| 5,023,924 A * | 6/1991 | Tajima et al. | 388/811 |
| 5,263,113 A * | 11/1993 | Naitoh et al. | 388/815 |
| 5,945,644 A * | 8/1999 | Jang | 187/296 |
| 6,628,096 B1 | 9/2003 | Chen | |
| 7,138,776 B1 | 11/2006 | Gauthier et al. | |
| 7,193,385 B2 * | 3/2007 | Emadi et al. | 318/568.18 |

(Continued)

FOREIGN PATENT DOCUMENTS

DE    102004030326 A1    2/2006

(Continued)

OTHER PUBLICATIONS

Office Action mailed on Mar. 24, 2010, for German Patent Application No. 102008046925, filed Sep. 12, 2008.

(Continued)

*Primary Examiner*—Bentsu Ro
(74) *Attorney, Agent, or Firm*—Ingrassia Fisher & Lorenz, P.C.

(57) ABSTRACT

Methods and apparatus are provided for providing a torque boost in an electric motor system at low speeds. The electric motor system comprises an alternating current (AC) synchronous electric motor, an inverter and a controller. The inverter is coupled to the AC synchronous electric motor and provides electric control therefore. The controller is coupled to the inverter and provides operational control signals thereto for operation of the electric motor. The controller includes a torque command gain block which modifies a torque command to generate a boosted torque signal in response to a detected speed of the electric motor, the torque command modified to define the boosted torque signal defined in accordance with a torque dependent scaling factor calculated in response to the torque command.

18 Claims, 6 Drawing Sheets

U.S. PATENT DOCUMENTS 7,218,071 B1     5/2007     Welchko et al.
2004/0061467 A1*     4/2004     Liu et al. .................... 318/463

FOREIGN PATENT DOCUMENTS

DE     102007001678 A1     8/2007

OTHER PUBLICATIONS

Office Action dated Sep. 13, 2006, issued in U.S. Appl. No. 11/375,429.
Response to U.S. Office Action dated Dec. 13, 2006, filed in U.S. Appl. No. 11/375,429.
Notice of Allowance dated Jan. 8, 2007, issued in U.S. Appl. No. 11/375,429.

* cited by examiner

LOW SPEED SYNCHRONOUS MOTOR DRIVE OPERATION

TECHNICAL FIELD

The present invention generally relates to electric motors, and more particularly relates to control systems for electric motors.

BACKGROUND OF THE INVENTION

Synchronous alternating current (AC) motors typically use sinusoidal current waveforms for operation. This results in smooth torque production for machines with a sinusoidal back-EMF profile. Square or trapezoidal current waveforms for operation of AC motors have been proposed to increase the torque output of the motors while maintaining a peak current stress. However, such methods recognize the advantage of utilizing normal sinusoidal current waveforms for operation at higher speeds. Typically, the transition between trapezoidal or square current waveforms and normal sinusoidal operation occurs at a predefined motor speed. Such transitions can be problematic due to the abrupt transition from trapezoidal to sinusoidal operation and visa versa.

Accordingly, it is desirable to provide a method and apparatus for generating trapezoidal currents and integrating the trapezoidal currents into a synchronous motor control structure in a seamless fashion. In addition, it is desirable to present a synchronous motor control method which provides enhanced low speed synchronous motor control while retaining robust motor control at higher speeds. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An electric motor system is provided for providing a torque boost at low speeds. The electric motor system comprises an alternating current (AC) synchronous electric motor, an inverter and a controller. The inverter is coupled to the AC synchronous electric motor and provides electric control therefore. The controller is connected to the inverter and provides operational control signals thereto for operation of the electric motor. The controller includes a torque command gain block which modifies a torque command to generate a boosted torque signal in response to a detected speed of the electric motor, the torque command modified to define the boosted torque signal in accordance with a torque dependent scaling factor calculated in response to the torque command.

A method is provided for generating a control signal to control an alternating current (AC) synchronous motor. The method comprises modifying a torque command in response to a speed of the AC synchronous motor to generate a boosted torque signal, and generating operational control signals for the AC synchronous motor in response to the boosted torque signal to provide a torque boost to the AC synchronous motor at low speeds.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
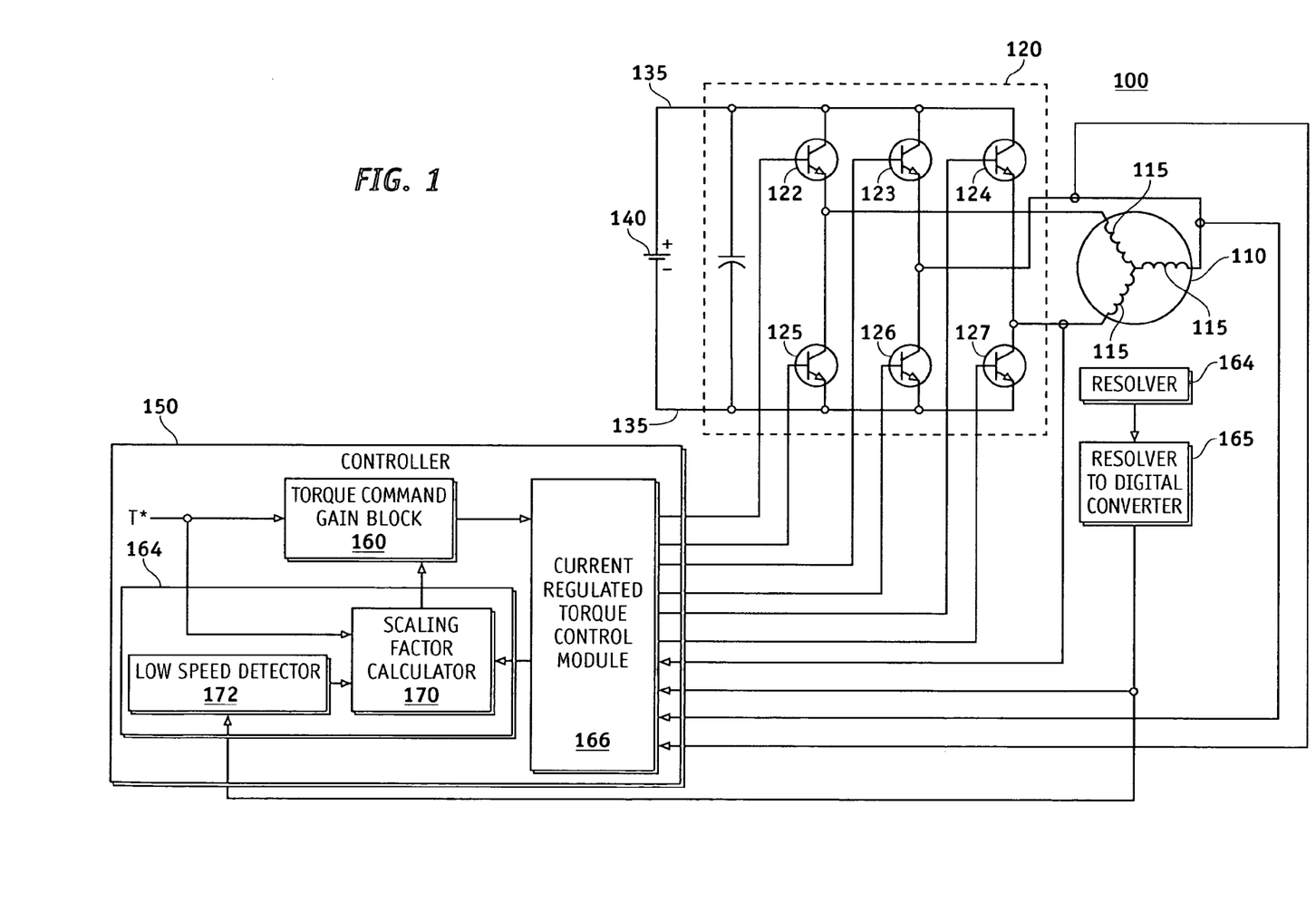
FIG. 1 illustrates an electric motor drive system in accordance with an embodiment of the present invention.

Referring to FIG. 1, an electric motor system 100 in accordance with an embodiment of the present invention includes a three-phase alternating current (AC) synchronous electric machine 110, such as a synchronous reluctance machine or a permanent magnet electric motor, which operates in response to signals from an inverter 120. The inverter 120 providing electric control for the electric motor 110 is connected between direct current (DC) bus lines 135 of a power source 140. The inverter 120 includes transistors 122 to 127, such as Insulated Gate Bipolar Transistors (IGBTs), and operates in response to signals from a controller 150 to gates thereof to provide voltage to each phase 115 of the motor 110, each of the transistor pairs 122/125, 123/126 and 124/127 forming a phase leg of the inverter 120.

A resolver 164 (or similar sensing device) is coupled to the motor 110 for measuring the rotor position and speed thereof. A resolver-to-digital converter 165 converts the signals from the resolver 164 to digital signals and provides those digital representations of angular position and velocity of the rotor of the AC synchronous electric motor 110 to the controller 150.

In accordance with the embodiment, the controller 150 includes a torque command gain block 160, a torque dependent scaling factor block 164 and a current regulated torque control module 166. The output of the current regulated torque control module 166 is coupled to the gates of each of the transistors 122 to 127 for providing a motor control signal to the inverter 120 as operational control signals for the transistors 122 to 127.

A torque control signal (torque command T*) is provided to an input of the torque command gain block 160. The torque dependent scaling factor block 164 is also coupled to receive the torque control signal for detecting the torque command T*. The torque dependent scaling factor block 164 includes a scaling factor calculator 170 and a low speed detector 172. The low speed detector 172 is connected to the resolver to digital converter 165 to receive the digital signal indicating the speed of the motor 110 and provides a low speed signal to the scaling factor calculator 170 for activation thereof in response to determining that the speed of the motor 110 is below a predetermined speed. The scaling factor calculator 170 receives the torque command, the low speed signal from the low speed detector 172 and current command signals from the current regulated torque control module 166 and, in response to these signals including the torque command detected, calculates a torque dependent scaling factor. The scaling factor calculator 170 provides a scaled torque boost signal representative of the torque dependent scaling factor to the torque command gain block 160 for modification of the torque command to generate a boosted torque signal in response to the low speed signal.

The current regulated torque control module 166 receives current signals from each phase 115 of the motor 110 and, in accordance with the present embodiment, modifies the currents at the phases 115 of the motor 110 in response to the boosted torque control signal received from the torque command gain block 160 to generate the operational control signals provided to the inverter 120.

Accordingly, the operational control signals apply the gain represented by the boosted torque signal to the command signals/voltage applied to the gates of the transistors 122 to 127. Thus, in accordance with the present embodiment, the currents at each of the phases 115 is received and modified by the current regulated torque control module 166 in response to the boosted torque signal to provide appropriate gain to the operational control signals while integrating a torque boost into the control structure through modification of the torque command during a limiting case close to zero speed by the scaled torque boost signal generated by the torque dependent scaling factor block 164 (i.e., when the low speed signal generated by the low speed detector 172 indicates that the detected speed is less than the predetermined speed).

Figure 2:
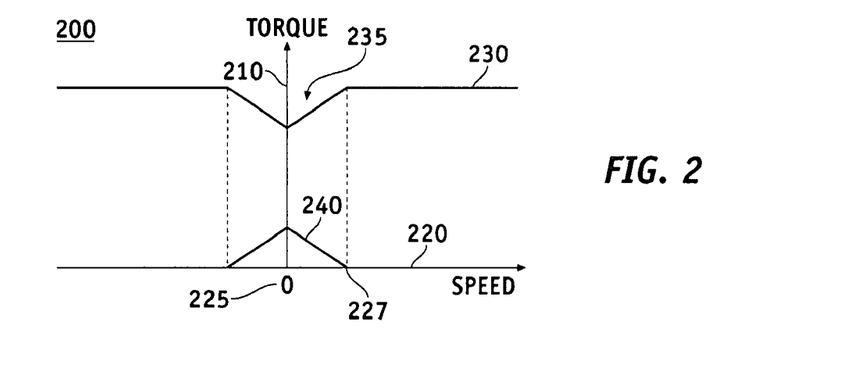
FIG. 2 illustrates a torque vs. speed graph for the electric motor system in accordance with the embodiment of the present invention.

Referring to FIG. 2, a torque vs. speed graph 200 illustrates how operation of the controller 150 modifies the torque command during the limiting case where the speed of the electric motor system 100 is close to zero. The graph 200 depicts torque produced by the electric motor system 100 while operating below base speed on axis 210 and speed of the motor 110 on axis 220, where zero speed is plotted at point 225. Synchronous motors such as motor 110 with sinusoidally distributed windings 115 are typically fed with a sine wave stator current waveform that generates smooth torque with minimal ripple. As shown in diagram 200, below base speed, the maximum torque is roughly constant with respect to speed and is limited by the root mean square (RMS) current capability of the inverter 120. This is known as the constant torque region.

However, at very low speeds such as the low speed plotted at point 227, the torque may need to be restricted to protect the transistors 122 to 127 because, at low speeds, the maximum torque capability of the drive is dictated by the thermal limit of the transistors 122 to 127. The restricted torque limit when the motor 110 is sinusoidally driven is shown on line 230.

The worst-case condition occurs when the peak phase current lines up with a phase leg of the inverter 120 at stall. In this case, the inverter 120 phase legs would then be required to carry the peak current continuously and, accordingly, with sinusoidal type machines, the peak phase current is selected to maximize the junction temperature of the transistors 122 to 127 at stall. This can significantly reduce the torque 230 from the normal peak torque which is available in the constant torque region. Above several hertz fundamental frequency, the thermal time constant of the transistors 122 to 127 will become relatively large with respect to the fundamental electrical frequency, and the current limit can then be raised to the normal RMS value.

As a result of the torque derating near stall, the motor torque limit 230 will have a notch 235 around zero speed. The torque limit notch 235 can create severe problems for electric motor systems 100 which require a large torque from zero speed. For example, some electric motor systems lack a reverse gear, so the system relies upon the torque of the motor 110 to propel the vehicle in the reverse direction. To meet the difficult reverse grade specification, the motor 110 is required to produce maximum torque from zero speed and at low revolutions per minute (RPMs). This requirement conflicts with the torque limit notch 235. To compensate for the degraded low speed torque, the current regulated torque control module 166 provides operational control signals to the inverter 120 having a maximum amount of torque boost integrated therein at stall, where the torque boost tapers off as the speed approaches the notch breakpoint as shown in the torque boost profile 240.

The torque boost profile 240 is created in response to the scaled torque boost signal generated by the torque dependent scaling factor block 164. In accordance with the present invention, in addition to providing the torque boost profile 240, the torque dependent scaling factor block 164 operating in conjunction with the torque command gain block 160 and the current regulated torque control module 166 is simple and easy to integrate into existing motor control structures. The torque control signal (the torque command T*) is provided to the input of the torque command gain block 160. As described in detail below, the torque command gain block 160 modifies the torque control signal to generate the boosted torque control signal for waveform shaping by the current regulated torque control module 166 of operational control signals for provision to the inverter 120 in response to the scaled torque boost signal generated by the torque dependent scaling factor block 164. Thus, the controller 150 provides enhanced low speed control of the AC synchronous motor 110 while retaining robust control thereof at higher speeds by modifying and/or manipulating the torque command for waveform shaping by the current regulated torque control module 166. While implementing the torque boost profile 240 in response to modification or manipulation of the torque command for waveform shaping, the torque boost profile 240 could also be implemented in accordance with the present embodiment by the current regulated torque control module 166 modifying the operational control signals (i.e., the voltage commands) provided to the gates of the transistors 122, 123, 124, 125, 126, 127 by manipulating signals in the synchronous reference frame (i.e., two direct current (DC) quantities) or the stationary reference frame (i.e., three sinusoidal AC currents).

Figure 3:
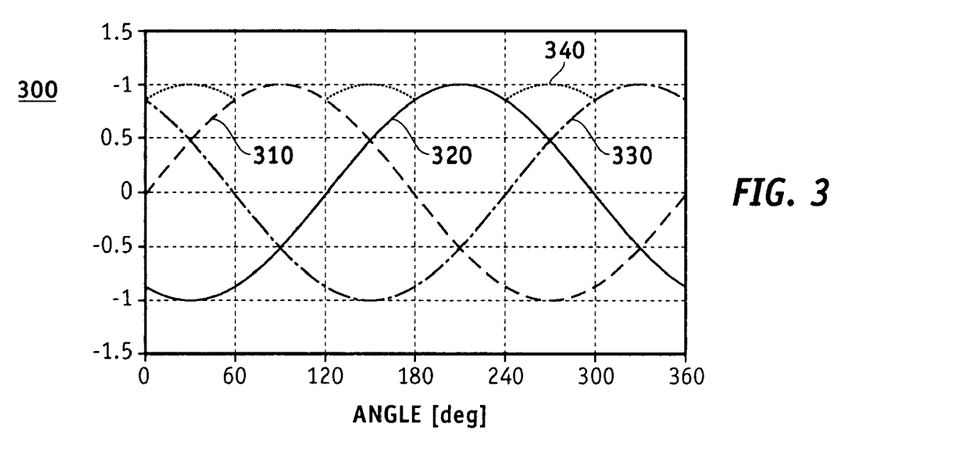
FIG. 3 illustrates a graph of phase current waveforms and phase current maximum absolute values for the electric motor system of FIG. 1.

Referring to FIG. 3, a graph 300 of phase current waveforms 310, 320, 330 and phase current maximum absolute values 340 for the electric motor system 100 shows sine wave currents which are generated by the transistors 122 to 127 in response to operational control signals from the current regulated torque control module 166 and are typically applied to the sinusoidal windings 115 of the motor 110. At low speed conditions, the peak current which must be limited due to thermal constraints of the transistors is the phase current maximum absolute values 340 which is defined in Equation 1:

$$I_{max} = \max[abs(I_a), abs(I_b), abs(I_c)] \qquad [1]$$

From the graph 340 of $I_{max}$, it can be seen that at only six rotor positions of the motor 110 will the phase current reach the peak value. Much of the time the silicon is under-utilized. Increasing the torque command in the under-utilized areas increases the average torque production.

Figure 4:
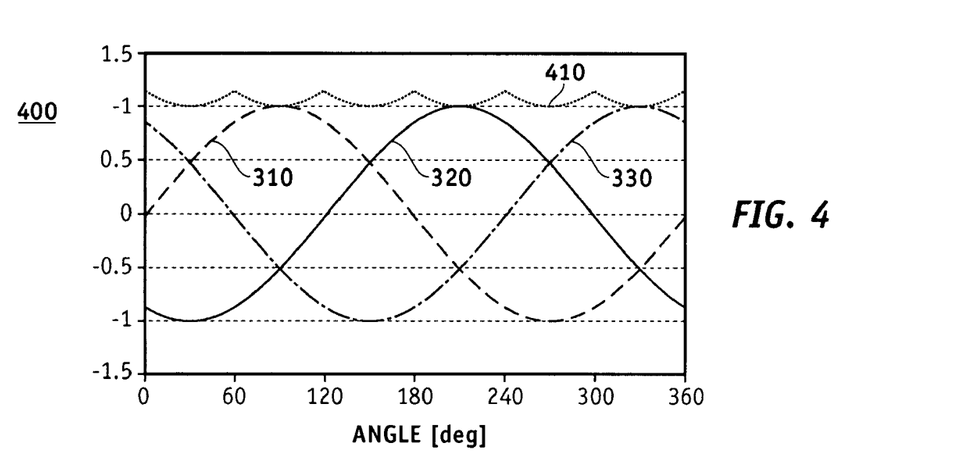
FIG. 4 illustrates a graph of phase current waveforms and phase current gain required for maximum current utilization for the electric motor system of FIG. 1.

FIG. 4 depicts the phase current waveforms 310, 320 and 330. In addition, a torque boost 410 is shown. The torque boost 410 is a maximum gain that can be applied directly to the phase currents without causing an increase in the peak current stress. While the torque boost 410 could be applied directly to the phase currents, in accordance with the present embodiment, the torque command T* is modified by the torque command gain block 160 and the current regulated torque control module 166 modifies the currents from the phases 115 of the motor 110 in response to the boosted torque signal from the torque command gain block 160 wherein the scale of the gain is adjusted by the scaled torque boost signal from the torque dependent scaling factor block 164 to account for the specific torque per amp ratio of the motor 110. The torque boost 410 is a position dependent gain which is used to modify the torque command at low speeds. Accordingly, the torque dependent scaling factor block 164 operates in response to the low speed signal from the low speed detector 172. In addition, the gain is scaled as a function of speed by the torque dependent scaling factor block 164 generating the scaled torque boost signal in response to the scaling signal from the scaling factor calculator 170. Utilizing the scaled torque boost signal from the torque dependent scaling factor block 164, the current regulated torque control module 166 operating in response to the boosted torque signal seamlessly merges the torque boost 410 into the sinusoidal operational control signals. The torque boost 410 increases the average torque, at the expense of increased torque ripple. Utilizing the methodology of the present embodiment can advantageously provide a maximum of 4.9% average torque boost.

Figure 5:
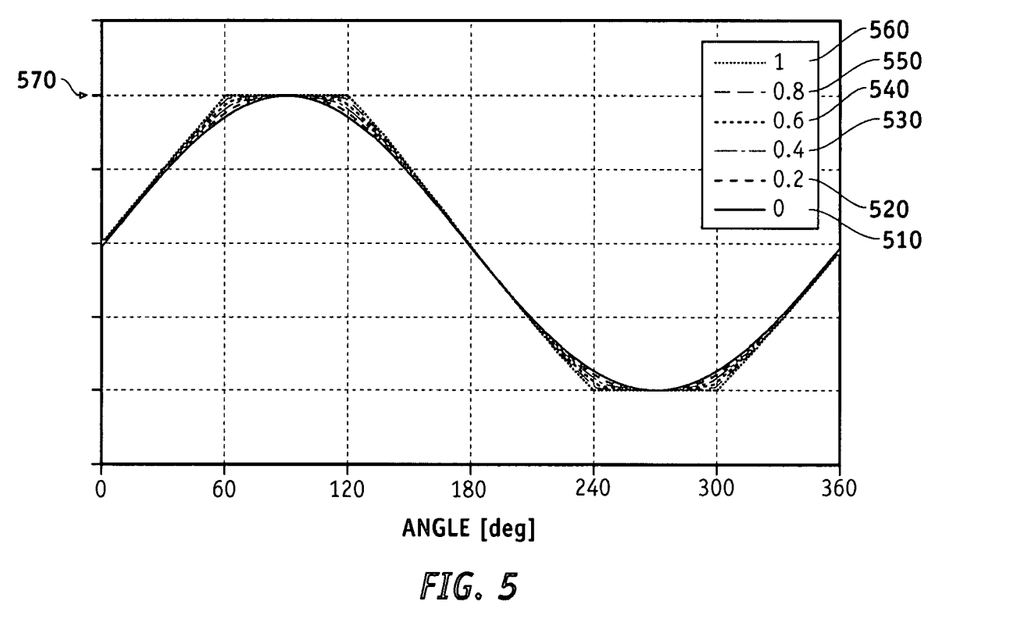
FIG. 5 illustrates graph of phase current waveforms providing torque boost in accordance with the embodiment of the present invention.

Referring to FIG. 5, graph 500 shows phase current waveforms 510, 520, 530, 540, 550 and 560 for varying amounts of torque boost ranging from zero gain (meaning no torque boost) as shown on waveform 510 to full boost as shown on waveform 560 (where the torque boost scaling factor is one), where the boost gain is derived as described hereinbelow. The peak current stress provided to the transistors 122 to 127 remains at line 570 despite the various amounts of torque boost. Thus, graph 500 shows that as the torque boost is scaled from zero to one, increased torque can be generated by the electric motor 110 without increasing the peak current stress on the transistors 122 to 127 of the inverter 120. When the torque boost scaling factor is one as depicted by phase current waveform 560, the average torque provided by phase current is 104.9% of the torque provided by a purely sinusoidal phase current waveform (i.e., phase current waveform 510 where the torque boost scaling factor is zero).

Figure 6:
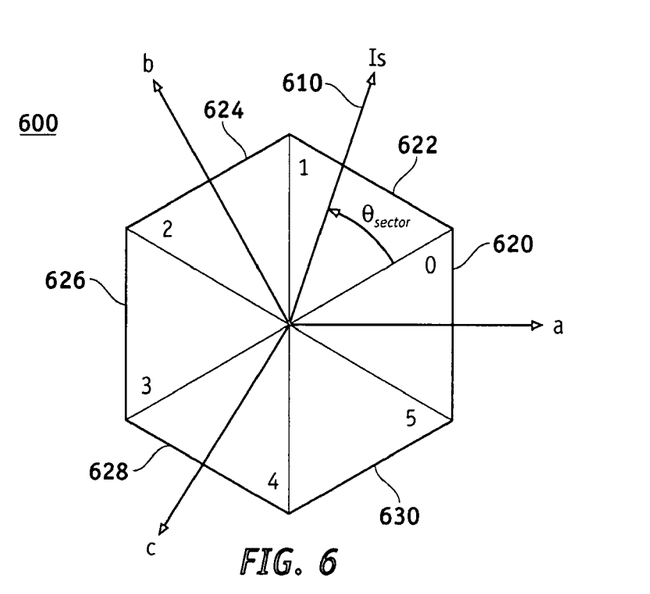
FIG. 6 illustrates a space vector diagram of an electric motor system in accordance with a first embodiment of the present invention.

Referring to FIG. 6, a stator current space vector 610 in the stationary reference frame 600 is shown. The stator current vector 610 rotates in a circular fashion. The plane of the stationary reference frame 600 is broken down into six sixty degree sectors 620, 622, 624, 626, 628, 630, each aligned to either a positive or negative phase axis.

Figure 7:
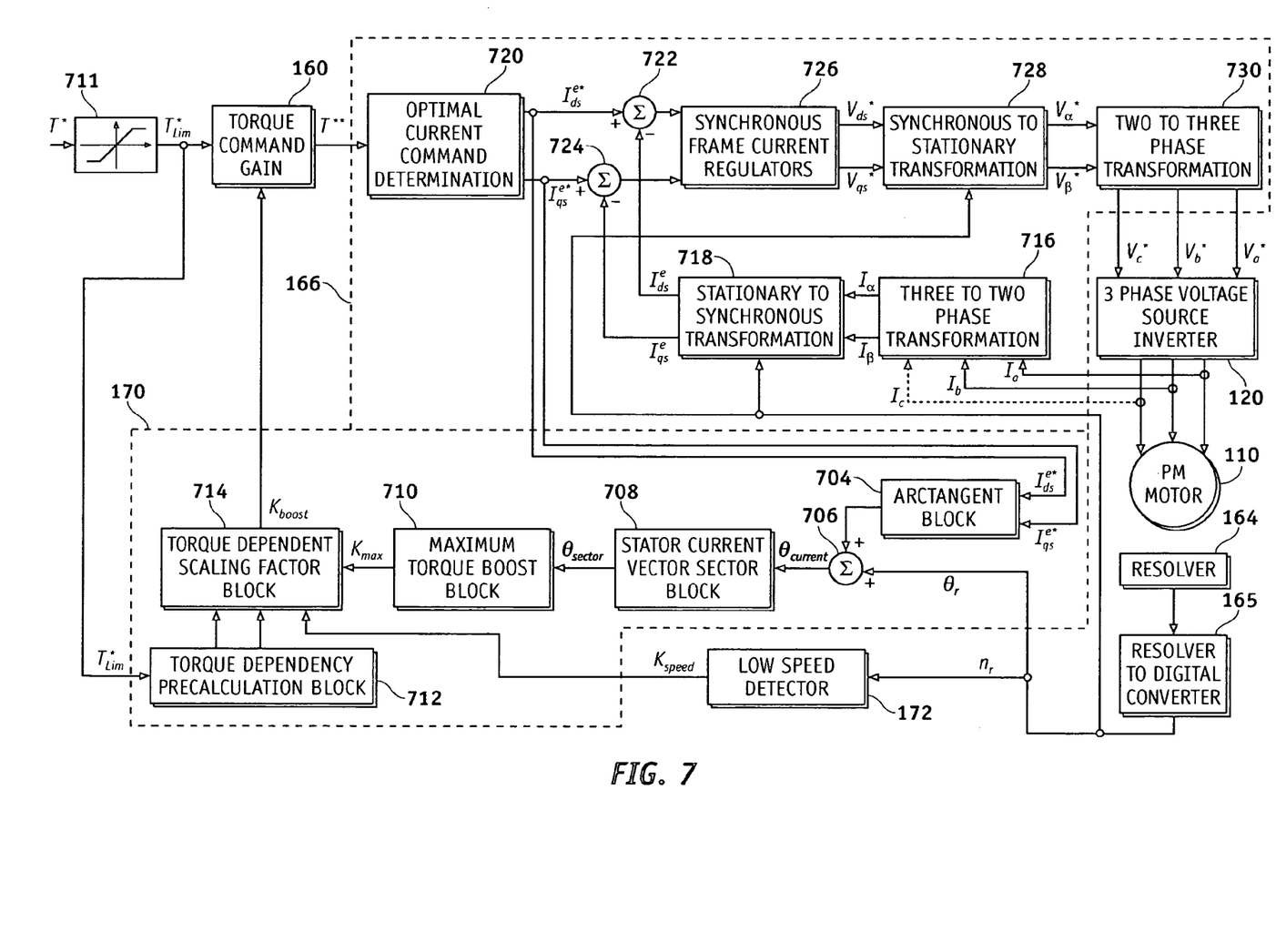
FIG. 7 illustrates a block diagram of the electric motor drive system of FIG. 1 in accordance with the embodiment of the present invention.

Referring to FIG. 7, exemplary circuitry blocks for performing the calculation functions in accordance with the present embodiment is depicted. Initially, the angle of the stator current vector 610 within a sector, $\theta_{sector}$, is calculated. While measurements for calculation of the angle of the stator current vector can be made utilizing the measured currents of the phases 115, the synchronous frame current commands, $I_{ds}^{e*}$ and $I_{qs}^{e*}$, from the current regulated torque control module 166 are provided to an arctangent block 704 of the scaling factor calculator 170 to utilize a noise free current signal. The arctangent block 704 determines the stator current position in the synchronous reference frame. This value is summed at a summer 706 with the rotor angular position, $\theta_r$, from the resolver to digital converter 165 to derive the angle $\theta_{current}$ of the stator current vector 610 in the stationary reference frame. This value is provided to a stator current vector sector block 708 which calculates the angle of the stator current vector 610 within a sector, $\theta_{sector}$.

The maximum torque boost, $K_{max}$, is then computed by a maximum torque boost block 710 as a function of position as shown in Equation 2.

$$K_{max} = \frac{1}{\cos(\theta_{sector})} \qquad [2]$$

The maximum gain can then be scaled as desired to phase in or phase out the torque boost. In accordance with the present embodiment, the torque boost is scaled as a function of speed by the scaling factor calculator 170. Equation 3 shows the scaling factor, $K_{speed}$, calculated by the low speed detector 172 which is used by the scaling factor calculator 170 to adjust the gain as a function of speed in accordance with the present embodiment, where $K_{speed}$ varies from 0 to 1. A $K_{speed}$ value of zero indicates that the low speed detector has detected that the speed is at or above the predetermined speed utilized for determining when to provide the torque boost signal.

$$K_{speed} = \max[0, (1 - m \cdot abs(n_r))] \qquad [3]$$

When the quantity $m \cdot abs(n_r)$ is less than one, the low speed detector 172 has detected that the speed is below the predetermined speed utilized for determining when to provide the torque boost signal. The variable m is used by the low speed detector 172 to define the slope of the torque boost profile 240 (FIG. 2) for the boosted torque signal. Equation 4 shows the derivation of the variable m, where $n_{r\_max}$ is the predetermined speed at which the torque boost is phased completely out (i.e., where $n_{r\_max}$ is the predetermined speed of the motor 110 below which the low speed signal, $K_{speed}$, provided by the low speed detector 172 to the scaling factor calculator 170 is not equal to zero).

$$m = \frac{1}{n_{r\_max}} \qquad [4]$$

Thus, in accordance with the slope m of the torque boost profile 240, at the predetermined speed $n_{r\_max}$ and above, the phase currents are in the normal sinusoidal shape, i.e., the signal provided from the torque dependent scaling factor block 164 to the torque command gain 160 is one and, consequently, the current regulated torque control module 166 provides three-phase control signals to the inverter 120 such that the motor phase currents are sinusoidal in nature.

In accordance with the present embodiment, the torque command T* is limited within a maximum torque value range by a torque command limiter block 711 to prevent damage to the inverter 120, where the maximum torque $T_{max}$ is determined by Equation 5. As seen in FIG. 5, above, a torque boost scaling factor such as depicted by phase current waveform 560 can provide an average torque of 104.9% of the torque provided by a purely sinusoidal phase current waveform. The nominal maximum torque $T_{max\_nom}$ is that which can be used to modify the operational signals to the transistors 122, 123, 124, 125, 126, 127 of the inverter 120 for sinusoidal phase currents without damage. In accordance with Equation 5, the value $T_{max}$ within the absolutes value of which the torque command T* is limited by the limiter 711 can range to a value of 104.9% of the $T_{max\_nom}$ as scaled back by the scaling factor $K_{speed}$.

$$T_{max} = T_{max\_nom} \cdot (1 + 0.049 \cdot K_{speed}) \quad [5]$$

Referring back to the scaling factor calculator 170, a torque dependency precalculation block 712 calculates a value $K_{Lin}$ which smoothly integrates and maintains torque linearity as the torque gain is boosted. The calculation of $K_{Lin}$ is shown in Equation 6. The value of $K_{Lin}$ provides the torque dependency for torque boosts provided in accordance with the present embodiment. Accordingly, the value of $K_{Lin}$ is zero when the absolute value of the limited torque command $T^*_{Lim}$ is less than or equal to the nominal maximum torque $T_{max\_nom}$ (i.e., when $|T^*_{Lim}|$ equals $T_{max\_max}$ the numerator of $K_{Lin}$ equals zero). In equation 6, $C_1$ is a constant to prevent the denominator of the fractional equation from going to zero in the case where $K_{speed}$ equals zero.

$$\text{if } (|T^*_{Lim}| < T_{max\_nom}) \; K_{Lin} = 0 \quad [6]$$
$$\text{else } K_{Lin} = \frac{|T^*_{Lim}| - T_{max\_nom}}{0.049 \cdot K_{speed} \cdot T_{max\_nom} + C_1}$$

Equation 7 provides the final boost gain (i.e., the scaled torque boost signal) calculated by the torque dependent scaling factor block 714, wherein the torque dependent scaling factor $K_{boost}$ is used to modify the torque command. The motor torque per amp ratio, $K_{TperA}$, is used to correct for the gain from the torque command to the phase current, where the ratio of $K_{speed}$ to $K_{TperA}$ is a factor for determining the increase over 100% that $K_{boost}$ will provide to the limited torque command T*Lim.

$$K_{boost} = 1 + K_{Lin} \cdot \frac{K_{speed}}{K_{TperA}} \cdot (K_{max} - 1) \quad [7]$$

All of the above calculations can be performed by the scaling factor calculator 170 at the same rate as the torque command is processed by the controller 150, which is typically done at a slower rate than the current regulation control provided by the current regulated torque control module 166. Hence, the computational impact on the controller 150 is relatively small. In this manner, the operational control signals generated by the current regulated torque control module 166 are defined in accordance with a speed dependent scaling factor calculated by the scaling factor calculator 170 and provided to the torque command gain block 160 as the scaled torque boost signal.

The current regulated torque control module 166 includes a three to two phase transformation block 716 which utilizes currents from the three phases 115 (or two of the phases from which the three current values can be determined) to generate two phase currents, $I_\alpha$ and $I_\beta$, in the stationary reference frame and a stationary to synchronous transformation block 718 transforms the currents $I_\alpha$ and $I_\beta$ to current values $I_{ds}^e$ and $I_{qs}^e$ in the synchronous reference frame, where the DC current values provide for easier calculation of the operational control signals in accordance with the present embodiment.

The torque dependent scaling factor $K_{boost}$ is provided from the scaling factor calculator 170 to the torque command gain block 160 for generation of the boosted torque command signal T**. An optimal current command determination block 720 of the current regulated torque control module 166 generates two current commands in the synchronous reference frame, $I_{ds}^{e*}$ and $I_{qs}^{e*}$, from the boosted torque command signal T**. As described above the signals $I_{ds}^{e*}$ and $I_{qs}^{e*}$ are provided to the scaling factor calculator 170 for calculation of the angle of the current vector, $\theta_{sector}$. In addition, the current commands $I_{ds}^{e*}$ and $I_{qs}^{e*}$ are combined with the current values $I_{ds}^e$ and $I_{qs}^e$ at d and q phase summers 722 and 724, respectively, for generation of current error signals. Synchronous frame current regulators 726 generate the synchronous frame operational signals having voltages $V_{ds}^{e*}$ and $V_{qs}^{e*}$.

A synchronous to stationary transformation block 728 transforms the synchronous frame operational signals $V_{ds}^{e*}$ and $V_{qs}^{e*}$ to two stationary frame operational signals $V^*_\alpha$ and $V^*_\beta$. A two to three phase transformation block 730 transforms the two stationary frame operational signals $V^*_\alpha$ and $V^*_\beta$ to three phase voltage operational signals $V^*_a$, $V^*_b$ and $V^*_c$ for provision to the respective three phase legs 122/125, 123/126 and 124/127 of the inverter 120. In this manner, the operational control signals for the inverter 120 are generated in response to the boosted torque signal T** to provide a torque boost to the AC synchronous motor 110 at low speeds.

Figure 8:
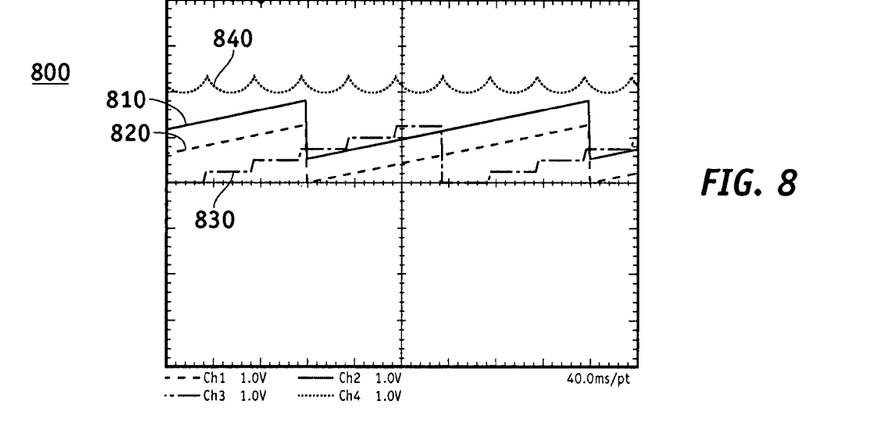
FIG. 8 illustrates waveforms used to generate a torque boost in accordance with the embodiment of the present invention.

Referring to FIG. 8, a graph 800 shows the waveforms used to generate the scaled torque boost signal. The rotor angular position 810 is a ramp waveform when operating at constant speed. The stator current position 820 is offset from the waveform 810 by a fixed amount corresponding to the control angle. From the stator current position 820, the sector 620, 622, 624, 626, 628 or 630 (FIG. 6) is determined, as shown on waveform 830. The maximum gain 840 can then computed as a function of the angle ($\theta_{sector}$) within each sector 820.

Since the torque boost function is only necessary at the maximum torque limits of the electric motor system 100, in accordance with the present embodiment this feature is disabled at lower torque levels by the scaling factor calculator 170 operating in response to the limited torque command $T^*_{Lim}$ as described in Equation 6. Additionally, the torque boost is enabled within a predefined speed window by the scaling factor $K_{Speed}$ (where the predefined speed window includes the notch 235 (FIG. 2)). Alternatively, rather than trying to maintain linearity through calculation of $K_{Lin}$, a threshold value could be used and a hysteresis function of the limited torque command to the scaling factor calculator 170 to prevent the boosted torque signal from unwanted oscillation (e.g., torque ripple) as the scaling factor calculator 170 is enabled and disabled.

Figure 9:
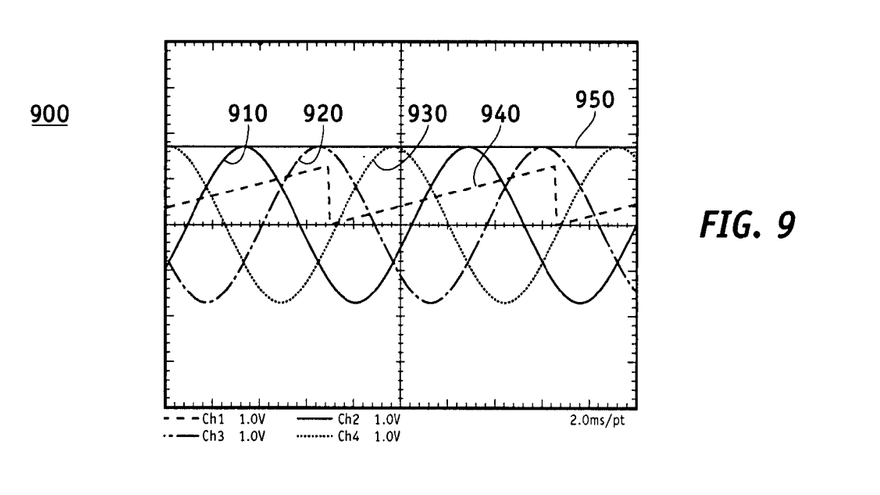
FIG. 9 illustrates non-boosted waveforms for the electric motor system of FIG. 1.
Figure 10:
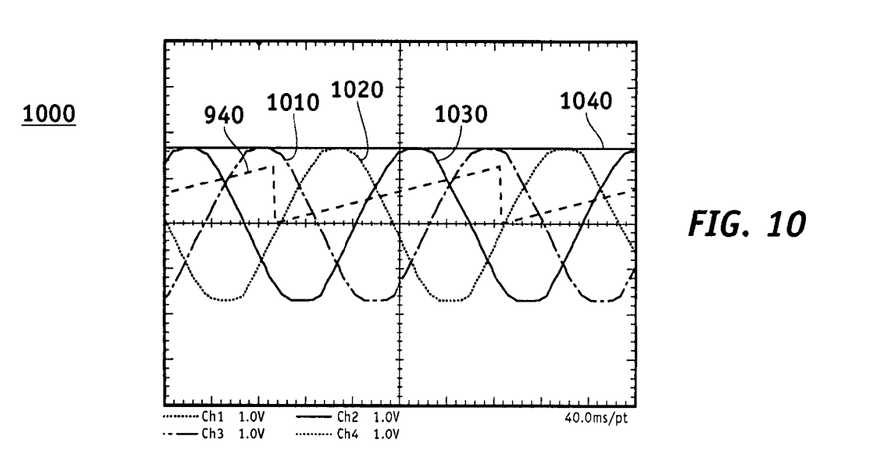
FIG. 10 illustrates torque boosted waveforms for the electric motor system of FIG. 1 in accordance with the embodiment of the present invention.

Referring to FIG. 9, a graph 900 shows the non-boosted sinusoidal waveforms 910, 920 and 930 provided to the inverter 120, where the rotor position is shown on the line 940 and a peak current value is shown by the line 950. A graph 1000 of FIG. 10 shows waveforms 1010, 1020 and 1030 wherein the torque boost is enabled by a $K_{speed}$ value greater than zero and less than one (i.e., less than full torque boost for the example depicted in FIGS. 9 and 10). The waveforms 1010, 1020, 1030 are quasi-sinusoidal in nature, approaching a trapezoidal type shape. The peak current value 1040 is the same as that in the non-boosted peak current value 950 shown in FIG. 9, yet the average torque has been increased by 3.6% in this example.

Hence, peak current stress has been held constant, while the utilization of the transistors 122 to 127 has been improved by increasing the RMS current value. Thus, in accordance with the present embodiment, the increases in the low speed average torque of up to 4.9% torque can be phased in without increasing the peak stresses in the silicon of the transistors 122 to 127. In addition, the electric motor system 100 in accordance with the present embodiment provides a torque boost solution which is simple to integrate into existing electric motor system control structure with minimal computational overhead.

It will be appreciated that controller 150 in accordance with the present embodiment has been described hereinabove as comprising functional blocks such as the torque command gain block 160, the torque dependent scaling factor block 164 and the current regulated torque control module 166, where the torque dependent scaling factor block 164 includes the additional functional blocks of the scaling factor calculator 170 and the low speed detector 172. While some or all of the functional blocks of the controller 150 could be implemented in a processor including unique stored program instructions that control the processor to execute the functions of the functional blocks shown in FIG. 1, the controller 150 may also be implemented one or more application specific integrated circuits (ASICs) in which each function or some combinations of certain of the functions are implemented as custom logic or by a state machine that has no stored program instructions. Alternatively, a combination of these approaches could be used.

Figure 11:
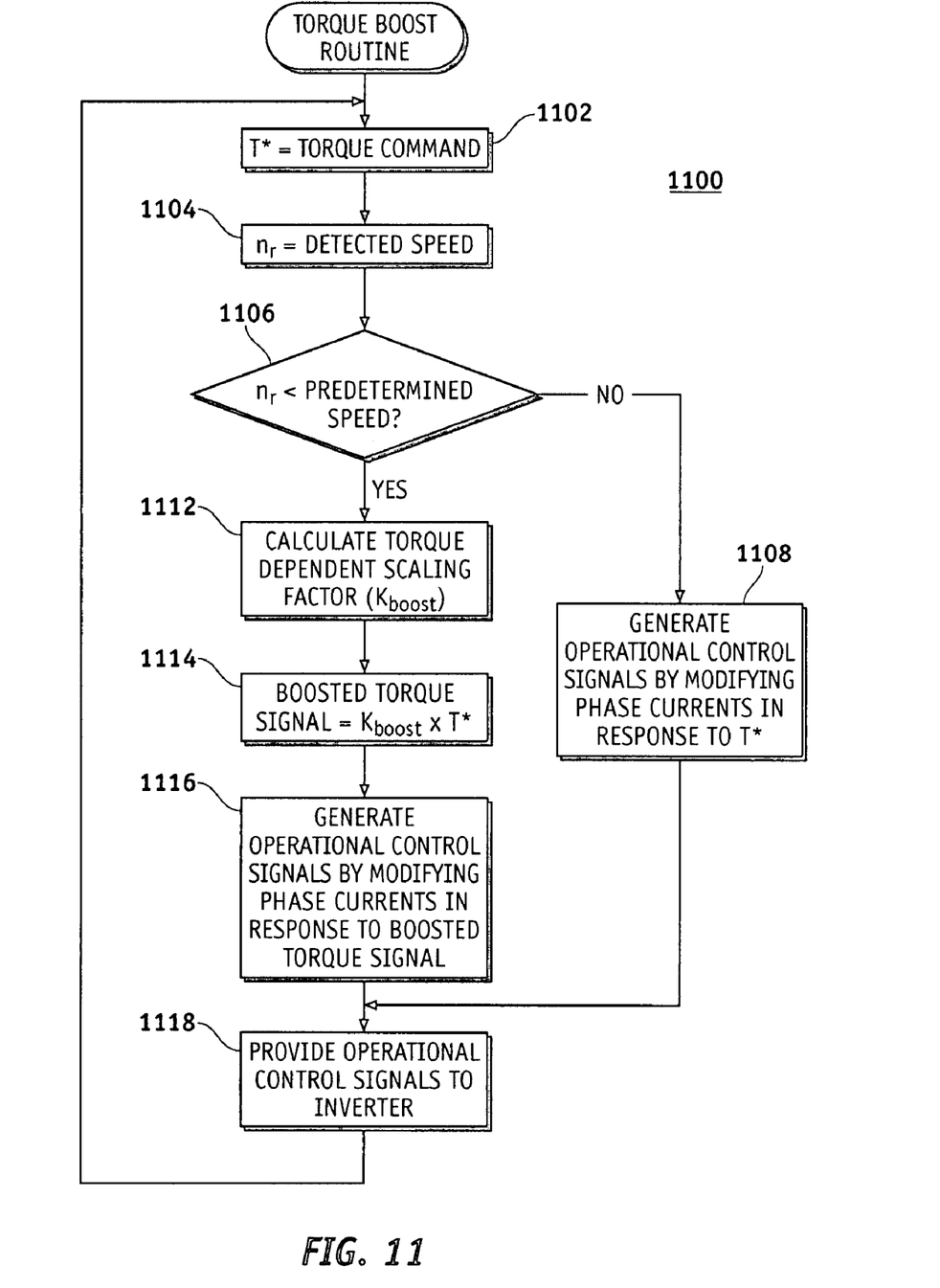
FIG. 11 illustrates a flowchart of the operation of a controller of the electric motor system of FIG. 1 in accordance with the embodiment of the present invention.

Accordingly, a flowchart 1100 is depicted in FIG. 11 to illustrate a software flow for the operation of the controller 150 in accordance with the torque boost routine of the present embodiment. It is expected that one of ordinary skill, when guided by the concepts and principles disclosed hereinabove, will be readily capable of implementing the controller 150 generating such software instructions and programs with minimal experimentation.

Operation of the controller 150 in accordance with the torque boost routine of the present embodiment begins by defining T* to equal the received torque command 1102 and defining $n_r$ to equal the detected speed 1104 of the AC synchronous electric motor 110. If the speed of the electric motor 110 is not less than a predetermined low speed 1106, the controller 150 modifying the phase currents of the AC synchronous electric motor 110 in response to the torque command T* to generate operational control signals 1108 for control of the motor 110. The operational control signals are then provided 1118 to the gates of the transistors 122 to 127 of the inverter 120.

When the speed of the electric motor 110 is less than the predetermined low speed 1106, the torque dependent scaling factor ($K_{boost}$) is calculated 1112 and a boosted torque signal is calculated 1114 by multiplying the torque command by the torque dependent scaling factor. The phase currents of the AC synchronous electric motor 110 are then modified in response to the boosted torque signal to generate the operational control signals 1116 and the operational control signals are provided 1110 to the gates of the transistors 122 to 127 of the inverter 120. As described above, modification of the phase currents of the AC synchronous electric motor 110 at steps 1108, 1116 is accomplished by modifying the phase currents in the synchronous reference frame by synchronous frame current commands corresponding to the unboosted or boosted torque command.

While an exemplary embodiment has been presented in the foregoing detailed description, it should be appreciated that a vast number of variations exist. It should also be appreciated that the exemplary embodiment is only an example, and is not intended to limit the scope, applicability, or configuration of the invention in any way. Rather, the foregoing detailed description will provide those skilled in the art with a convenient road map for implementing the exemplary embodiment or other embodiments. It should be understood that various changes can be made in the function and arrangement of elements without departing from the scope of the invention as set forth in the appended claims and the legal equivalents thereof.

What is claimed is:

1. A method for generating operational control signals to control an alternating current (AC) synchronous motor, the method comprising the steps of:
   modifying a torque dependent scaling factor in response to a speed of the AC synchronous motor;
   modifying the torque command in response to the torque dependent scaling factor and the phase currents of the AC synchronous motor to generate the boosted torque signal when the speed of the AC synchronous motor is determined to be below the predetermined speed; and
   generating the operational control signals for the AC synchronous motor in response to the boosted torque signal and phase currents of the AC synchronous motor to provide a torque boost to the AC synchronous motor when the speed of the AC synchronous motor is determined to be below a predetermined speed.

2. The method in accordance with claim 1 wherein the step of generating operational control signals for the AC synchronous motor comprises the step of generating operational control signals for the AC synchronous motor in response to the boosted torque signal and the phase currents of the AC synchronous motor to provide a torque boost to the AC synchronous motor, wherein the torque boost is provided in response to the torque dependent scaling factor.

3. The method in accordance with claim 1 wherein the step of generating operational control signals for the AC synchronous motor comprises the steps of:
   generating operational control signals for the AC synchronous motor in response to the boosted torque signal and the phase currents of the AC synchronous motor when the speed of the AC synchronous motor is determined to be below the predetermined speed; and
   generating operational control signals for the AC synchronous motor in response to the torque command when the speed of the AC synchronous motor is determined to be equal to or above the predetermined speed.

4. A method for providing torque to an alternating current (AC) synchronous motor, comprising the steps of:
   detecting a speed of the AC synchronous motor;
   calculating a torque dependent scaling factor in response to the speed detected; and
   in response to the speed detected, providing a torque boost to the AC synchronous motor, the torque boost determined in response to the torque dependent scaling factor and phase currents of the AC synchronous motor, wherein the step of providing the torque boost comprises the steps of:
   generating a boosted torque signal in response to the torque dependent scaling factor and the phase currents of the AC synchronous motor;
   generating operational control signals in response to the boosted torque signal; and
   providing the operational signals to the AC synchronous motor for providing the torque boost thereto.

5. The method in accordance with claim 4 wherein the step of providing the torque boost comprises the step of providing the torque boost to the AC synchronous motor in response to determining that the speed detected is below a predetermined speed.

6. The method in accordance with claim 4 wherein the step of generating the boosted torque signal comprises the step of generating the boosted torque signal in response to the torque dependent scaling factor, the phases of the AC synchronous motor and a torque command.

7. A method for providing torque to an alternating current (AC) synchronous motor, comprising the steps of:
   detecting a speed of the AC synchronous motor;
   calculating a torque dependent scaling factor in response to the speed detected; and
   in response to the speed detected, providing a torque boost to the AC synchronous motor, wherein the step of providing the torque boost comprises the steps of:
      generating a boosted torque signal in response to the torque dependent scaling factor and a torque command;
      generating the operational control signals in response to the boosted torque signal and phase currents of the AC synchronous motor; and
      providing the operational signals to the AC synchronous motor for providing the torque boost thereto.

8. The method in accordance with claim 7 wherein the step of generating the operational control signals comprises the step of modifying synchronous reference frame currents corresponding to the phase currents of the AC synchronous motor in response to the boosted torque signal to generate the operational control signals.

9. The method in accordance with claim 8 wherein the step of detecting the speed of the AC synchronous motor comprises the step of determining whether the AC synchronous motor is operating below a predetermined speed to provide a torque boost to the AC synchronous motor.

10. The method in accordance with claim 8 wherein the step of modifying the synchronous reference frame currents comprises the steps of:
    modifying the synchronous reference frame current commands corresponding to the boosted torque signal in response to determining that the speed detected is below a predetermined speed; and
    modifying the synchronous reference frame current commands corresponding to the torque signal in response to determining that the speed detected is equal to or above the predetermined speed.

11. An electric motor system, comprising:
    an alternating current (AC) synchronous electric motor;
    an inverter coupled to the AC synchronous electric motor and providing electric control therefor; and
    a controller connected to the inverter for providing operational control signals thereto for operation of the AC synchronous electric motor, the controller including a torque command gain block for modifying a torque command to generate a boosted torque signal, wherein the torque command gain block generates the boosted torque signal in response to a detected speed of the AC synchronous electric motor, the torque command modified to define the boosted torque signal in accordance with a torque dependent scaling factor calculated in response to the torque command.

12. The electric motor system in accordance with claim 11 wherein the controller further includes a low speed detector coupled to the AC synchronous electric motor for determining the detected speed thereof.

13. The electric motor system in accordance with claim 12 wherein the torque command gain block generates the boosted torque signal in response to the low speed detector determining that the detected speed is below a predetermined speed.

14. The electric motor system in accordance with claim 12 wherein the controller further includes a current regulated torque control module coupled to the torque command gain block for modifying phase currents of the AC synchronous electric motor in response to the boosted torque signal to generate the operational control signals for provision to the inverter for control of the AC synchronous electric motor.

15. The electric motor system in accordance with claim 14 wherein the controller further includes a scaling factor calculator coupled to the low speed detector for generating a scaled torque boost signal in response to the detected speed and the speed dependent scaling factor, and wherein the torque command gain block is coupled to the scaling factor calculator and modifies the torque command in response to the scaled torque boost signal to generate the boosted torque signal.

16. The electric motor system in accordance with claim 15 wherein the current regulated torque control module is coupled to the torque command gain block and, in response to the boosted torque signal, modifies synchronous reference frame current values corresponding to the phase currents of the AC synchronous electric motor in response to synchronous reference frame current commands corresponding to the scaled torque boost signal when the detected speed is below a predetermined speed and modifying the synchronous reference frame current values corresponding to the phase currents of the AC synchronous electric motor in response to synchronous reference frame current commands corresponding to the torque command when the detected speed is equal to or above the predetermined speed to generate the operational control signals which provide a torque boost to the AC synchronous electric motor.

17. The electric motor system in accordance with claim 11 wherein the AC synchronous electric motor comprises a permanent magnet electric motor.

18. The electric motor system in accordance with claim 11 wherein the inverter comprises a plurality of Insulated Gate Bipolar Transistors (IGBTs) having the gates thereof coupled to the controller for receiving the operational control signals therefrom, the plurality of IGBTs controlling operation of the AC synchronous electric motor.

* * * * *